Dec. 6, 1960 J. H. BARNES 2,963,319
SEPARATELY ATTACHABLE TRIM MEMBER ASSEMBLY
Filed June 29, 1956 2 Sheets-Sheet 1

INVENTOR.
JAMES H. BARNES
BY Oldham & Oldham
ATTYS.

Dec. 6, 1960 J. H. BARNES 2,963,319
SEPARATELY ATTACHABLE TRIM MEMBER ASSEMBLY
Filed June 29, 1956 2 Sheets-Sheet 2

INVENTOR.
JAMES H. BARNES
BY Oldham & Oldham
ATTYS

United States Patent Office 2,963,319
Patented Dec. 6, 1960

2,963,319

SEPARATELY ATTACHABLE TRIM MEMBER ASSEMBLY

James H. Barnes, Wadsworth, Ohio, assignor to Edward L. Wood, Detroit, Mich.

Filed June 29, 1956, Ser. No. 594,804

4 Claims. (Cl. 301—37)

This invention relates to trim members for use with pneumatic tire and rim assemblies, and especially to a separate trim member adapted to be engaged with such tire and rim assembly without deflation of the tire or change of the tire and rim means in any manner for assembly of the trim means.

Heretofore there have been several types of trim and decorative members proposed for use with pneumatic tire and wheel assemblies in order to endeavor to provide attractive and protective sides for the tires. The well known conventional white sidewall tire is expensive and cannot be transferred from car to car so that there has been quite a commercial production and sale of separate or removable trim members for use with pneumatic tire and wheel assemblies. One of such constructions is shown in my own prior Patent No. 2,737,422 and trim members of such type have been widely made and sold heretofore. However, there has been appreciable work required in positioning such trim members upon tire and wheel assemblies and purchasers of the trim members have usually been required to pay an additional charge for mounting the trim members correctly on a tire and wheel assembly.

It is the general object of the invention to provide a new and improved type of a trim member characterized by its ability to be attached to a tire and rim assembly without deflation of the tire or without any specially skilled assembly procedure being required.

Another object of the invention is to provide a trim member of the class described adapted to be attached to a pneumatic tire and wheel assembly by the use of separate clip means engageable with the rim flange and usually by the addition of an anchor ring member for engaging these clip means and securing the trim member thereto by a radially inner portion of the trim member.

Another object of the invention is to provide a separately attachable trim member and side ring unit for pneumatic tire sidewalls wherein the assembly is all positioned externally or laterally of the tire and rim assembly and of any wheel weights thereon and which, when assembled, simulates the appearance of a tire rim flange.

A further object of the invention is to provide a trim member for use with a pneumatic tire sidewall wherein the trim member has separate locking studs or other securing or anchoring means thereon for engaging with clip and anchor ring means used in combination therewith to aid in securing the trim member in position.

Yet another object of the invention is to provide a trim and decorative member as described which is adapted to be positioned in closely spaced relationship to a tire and rim assembly but which trim member is positioned on the lateral or side portion of such assembly.

A further object of the invention is to position a trim member of the class described on a tire and rim assembly by the use of special clip means having apertures provided therein and wherein the trim members have apertures in radially inner portions thereof and where separate locking studs extend through aligned apertures in the trim member and clips to secure the trim member to the tire and rim assembly when the clips are operatively positioned thereon.

Yet another object of the invention is to aid in positioning a trim member on a pneumatic tire and wheel assembly by a complementary annular locking rib formed on the trim member and an annular receiving bead on the anchor ring so that the rib seats in the bead and aids in the mounting of the trim member.

The foregoing and other objects and advantages of the invention will be made more apparent as this application proceeds.

In order to understand the invention, reference should be had to the accompanying drawings wherein several trim member assemblies involving the principles of the invention are shown, and wherein.

When referring to corresponding parts shown in the drawings and referred to in the specification, corresponding numerals are used to facilitate comparison therebetween.

It will be realized that the trim and protective member of the invention in general corresponds to the structure as described in my above-identified U.S. patent. However, this member may be made from rubber or rubberlike material, or any plastic material which has the desired strength and resiliency for structures of this type and is of modified shape for practice of the present invention.

My invention, generally speaking, relates to the provision of an apparatus for securing a trim and decorative member to a tire and rim assembly wherein clip means are provided for engaging the rim flange to extend radially inwardly therefrom, a resilient trim member is provided for positioning on a tire rim against the clips to extend radially outwardly therefrom and bear on the sidewall of the tire mounted on the rim, and anchor ring means are provided for engaging and being secured by the clip means to the tire rim to clamp the trim member thereagainst. The trim member may have locking means provided integrally therewith and one of the clip means or anchor means is adapted to engage such locking means for aiding in positioning the trim member.

Figure 1:
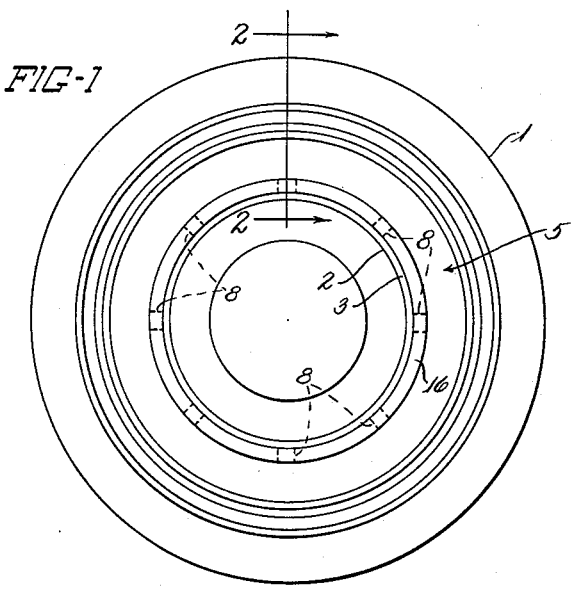
Fig. 1 is an elevation of a pneumatic tire and rim assembly having a trim member of the invention secured thereto.
Figure 2:
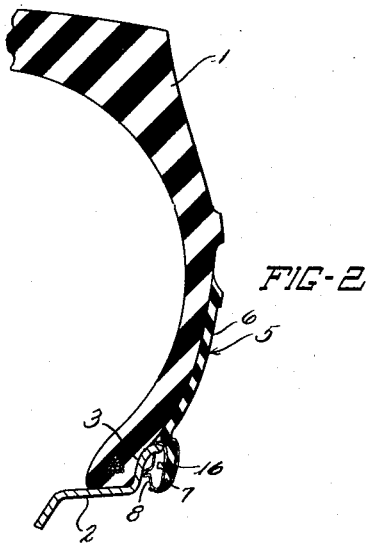
Fig. 2 is an enlarged section taken on line 2—2 of Fig. 1.

Attention now is directed to the details of the various structures shown on the attached drawings wherein in Fig. 1, a tire and rim or wheel assembly is provided and a pneumatic tire 1 of conventional construction is shown positioned upon a tire rim 2. This rim 2 may be an integral part of a wheel or it may be a separate rim, as desired. This rim 2 has an edge rim flange 3 provided thereon having a substantially axially outwardly directed edge 4 provided thereon.

As an important feature of the invention, a resilient trim member 5 is mounted on and carried by the tire and rim assembly by separate means at the side of the rim flange. This trim member 5 is of the same general type as disclosed in my previously identified patent and wherein the trim member is an integral molded unit made from resilient materials, such as rubber, rubber-like materials or other plastic substances. The trim member 5 is provided with a radially outer decorative portion 6 and is adapted to lie snugly against the sidewall of the tire 1; while a radially inner skirt portion 7 is provided on the trim member and the skirt portion 7 is used for anchoring or securing the trim member in position. Initially, the trim member 5 is of a molded shape or contour so that the decorative portion extends appreciably axially inwardly with relation to the tire 1 and sidewall thereof, as ultimately positioned for operative purposes. This sets up resilient forces in the trim member 5 when the decorative portion 6 is forced axially outwardly when operatively positioned and this aids in maintaining the desired operative relationship between the decorative portion of the trim member and the tire sidewall.

Figure 3:
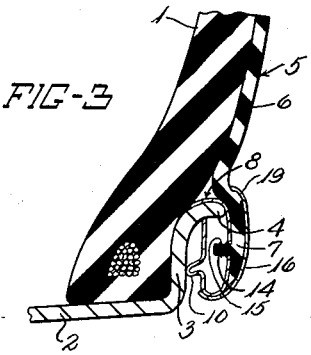
Fig. 3 is a section, similar to Fig. 2, but to enlarge a portion thereof to bring out further details of the assembly of the invention.
Figure 4:
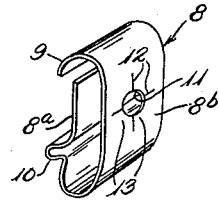
Fig. 4 is a perspective view of a clip member as can be used in practice of the invention.

Fig. 4 shows a clip 8 usually made from metal and which clip is shown as having an inner wall 8a and an outer wall 8b and with the clip including an overhanging top edge flange 9. These clips are preferably made from metal and are adapted to be forced or driven into engagement with the tire rim flange 3 at the flange edge 4 thereof and engage it between the flange 9 and the top edge of the inner wall 8a. Preferably this top overhanging flange 9 extends inwardly of the rim flange 3 far enough so as to be wedged between the bead portion of the tire 1 and the adjacent portion of the rim flange 3, as shown in Fig. 3. A slight resiliency of the clip 8 in a direction radially of the rim 2 is provided in most instances, as by the provision of a U-shaped section 10 on the inner wall 8a of the clip 8. Resiliency in the clip may be provided in other suitable manners. The outer wall, or some exposed portion of the clip 8 is provided with a resilient locking section therein for engaging with locking members and thus an aperture 11 is formed in such outer wall 8b and a plurality of slots or splits 12 extend from this aperture 11 in order to form at least semi-resilient locking sections 13 in a portion of the wall of the clip 8.

An important feature of the invention is that the trim member 5 may be provided with integral studs, locking means or locking ribs 14 extending from the skirt portion 7 thereof in an axially inward direction in the tire and rim assembly. Such studs 14, in this instance, are shown to be integral with the skirt portion 7 of the trim member and have suitable ribs or corrugations thereon to aid in retaining the studs in an assembled position. The studs 14 extend through the apertures 11 in the clip 8. Shoulders 15 are directed towards the skirt portion 7 on axially spaced portions of these studs 14 so that the studs can be relatively easily pushed through the apertures 11 from the outer surface of the clip but that it is much harder to pull the studs from the clip after once engaged therewith.

In order to complete the anchoring of the trim member 5 to the rim 2, preferably a metal anchor ring 16 of generally C-shape in section is provided. The radially inner portion of such anchor ring 16 is adaptable to be sprung or snapped over the radially inner edges of the plurality of the metal clips 8 when engaged with the tire rim 2, as indicated in Fig. 1, at spaced circumferential portions thereof. The remaining portion of the anchor ring 16 thus is pressed against the skirt portion 7 of the trim member, to force it against the rim flange 3. Likewise, the decorative portion 6 extends up in snug engagement with the sidewall of the tire 1.

When separate locking studs 14 are used, they may include suitable inserts, or cores, or may comprise a headed metal stud with only its head embedded in the material forming the trim member 5.

Figure 5:
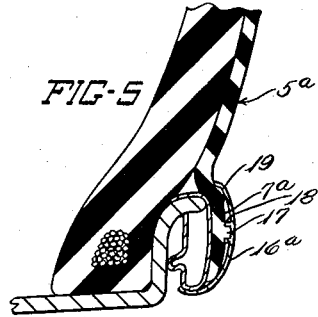
Fig. 5 is a fragmentary section, like Fig. 3, only showing a modified embodiment of the invention.

Fig. 5 shows a construction generally similar to that shown in Figs. 1 to 4 only in this instance, anchoring studs or ribs 17 are provided on the axially outer surface of a skirt portion 7a of a trim member 5a. These studs 17 may be circumferentially spaced about the trim member 5a, or may be in the form of a continuous rib on such trim member. In all events, complementary anchoring, or sealing means 18 to the studs or ribs 17 are provided on the axially inner surface of the ring 16a so that a definite engagement can be provided between the trim member 5a and anchor ring 2a to aid in securing the members in assembled relationship.

The engagement of the various parts of the trim and decorative assembly of the invention is facilitated by providing a rib 19 adjacent the connection of the skirt portion 7 of the trim members with the decorative portions 6 thereof. Such rib 19 is engaged by the radially outer edge of the anchor ring provided in the assembly.

Figure 6:
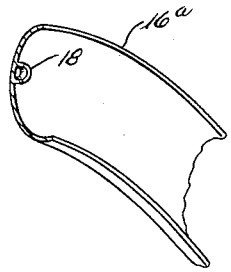
Fig. 6 is a fragmentary perspective, partly in section, of the anchor ring of Fig. 5.

Fig. 6 shows an inside perspective view of the anchor ring 16a which has a plurality of circumferentially spaced bosses 18 provided for engaging the studs 17 on the trim member 5a.

Figure 7:
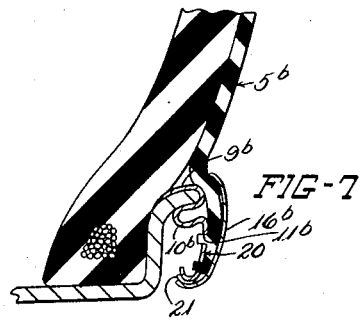
Fig. 7 is a sectional view, similar to Fig. 3, only illustrating another embodiment of the invention.

Fig. 7 shows the use of a modified type of a clip 20 in the assembly of the invention. In this instance, the clip 20, has an overhanging edge flange 9b provided thereon and with a U-shaped section 10b being formed in the wall of the clip 20. A plurality of apertures 11b, which may or may not have locking sections provided in association therewith, like the clip 8 are provided for engaging suitable studs or similar members on the trim member 5b present in this assembly of the invention.

Another feature of the clip 20 is that it has a resilient, protruding locking finger or section 21 on the lower or radially inner part thereof to facilitate springing an anchor ring 16b thereover and securing it thereto. This locking finger 21 is usually formed integrally with the clip 20 by punching or forcing a section therefrom.

Such a construction provides extra radial resiliency between the clip 20, the anchor ring 16b and the associated parts so that the springing or forcing of the anchor ring 16b over the clip 20 to an engaging or operating position is facilitated. Likewise, the release of the anchor ring is facilitated when this locking finger or section 21 is used.

Figure 8:
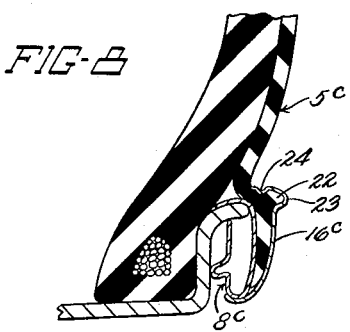
Fig. 8 is a fragmentary section, similar to Fig. 3 of a further modification of the invention and showing a locking rib on the trim member and a receiving bead on the locking ring.

Fig. 8 of the drawings shows the use of a special trim member 5c that has a continuous annular, integral locking, or anchoring rib, or projection means 22 provided thereon. This locking rib 22 is formed substantially complementary to a bead 23 formed on an anchor ring 16c used in this embodiment of the invention and positioned in the desired manner by use of suitable metal clips, as previously described. It will be seen that the locking rib 22 and anchor bead 23 are generally complementary in shape and that such bead 23 at least simulates the appearance of a rim edge flange to maintain the normal appearance of the tire and rim assembly even with the trim member of the invention engaged therewith. It should be noted that this bead 23 formed on the anchor ring 16 has a little rib 24, which is radially inwardly directed, provided thereon and seats behind and in engagement with the locking rib 22. This aids in maintaining the trim member anchored fixedly on the assembly shown.

Figure 9:
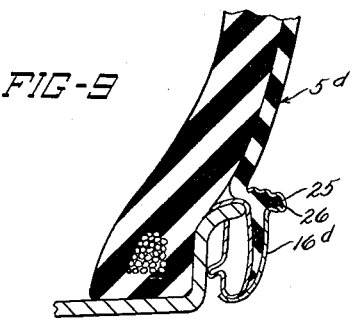
Fig. 9 is a section, similar to Fig. 3, of a further modification of the invention similar to that shown in Fig. 8.

Fig. 9 shows a modification of the general structure shown in Fig. 8 and in this instance a trim member 5d is provided which has a continuous annular locking rib 25 provided thereon. Such locking rib 25 is at least substantially complementary in shape to an annularly corrugated anchoring bead 26 provided on an anchor ring 16d so that such locking rib 25 and bead 26 can be forced into engagement with each other and aid in securely positioning the trim member on a tire assembly.

Figure 12:
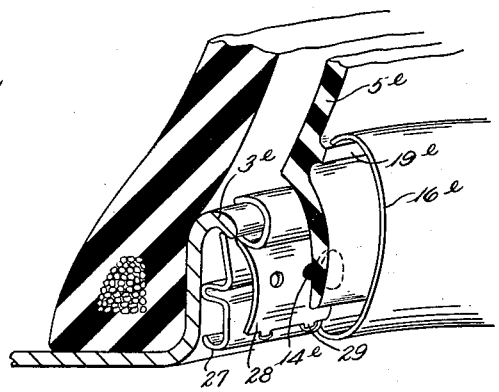
Fig. 12 is a fragmentary section, like Fig. 3, but with parts partially broken away or removed to show assembly of the clip of Fig. 11 in an embodiment of the invention.
Figure 11:
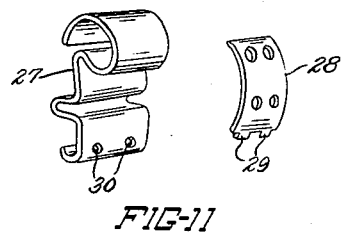
Fig. 11 is a perspective, exploded view of a modified clip means of the invention.

The use of a two-part metal clip comprising an anchor clip 27 and a lock plate 28 is shown in Figs. 11 and 12 of the drawings. Thus the anchor clip 27 can be forced onto or otherwise engaged with a rim flange 3e and then a trim member 5e may be engaged with the lock plate 28 by means of a plurality of anchoring studs 14e that are formed integrally with such trim member 5e. These anchoring studs 14e are engaged with apertures provided in the lock plate 28 and may be engaged therewith prior to assembly of such lock plate upon the anchor clip 27. The lock plate 28 has small projections 29 formed on one end thereof that are adapted to be received in apertures 30 provided in the anchor clip 27. The lock plates 28 can be sprung into engagement with the anchor clips 27 when the lugs 29 are positioned in the apertures 30. The completion of the assembly of the trim member 5e on the tire and rim is provided by means of an anchor ring 16e which engages the clips 27 and a locking rib 19e on the trim member 5e.

Figure 10:
Fig. 10 is a perspective view, partially in section, of the trim member used in Fig. 8 and wherein the skirt portion is slotted for receiving mounting clip means therein.

In some instances it may be desirable to position the trim members against the rim flanges in the tire and wheel assemblies as tightly as possible. Thus Fig. 10 of the drawings shows how the trim member 5d may have cut out sections, slots, or apertures 34 provided in circumferentially spaced portions thereof. Such apertures or slots 34 would be provided at the desired locations of the clip 8c, in Fig. 8, and would permit the trim member and the skirt portion thereof to lie closely against the tire rim edge flange and bridge smoothly over the clip means provided.

It should be realized that any of the clip styles shown herein can be used with any of the desired types of anchoring means and/or locking ribs or equivalents provided on the trim members and associated parts of the novel assembly of the invention.

In view of the foregoing, it is believed that a novel, attractive trim member unit has been provided and that it can be readily mounted on a tire assembly without any reassembly or change thereof. Hence it is thought that the objects of the invention have been achieved.

While several complete embodiments of the invention have been disclosed herein, it will be appreciated that modification of these particular embodiments of the invention may be resorted to without departing from the scope of the invention as defined in the appended claims.

What is claimed is:

1. Apparatus for securing a resilient trim member to a pneumatic tire and rim assembly and comprising a plurality of metal clip members having overhanging radially outer edge flanges, a trim member having radially inner and outer sections, said clip members being adapted to engage a tire rim flange, said trim member having integral anchoring means extending outwardly therefrom, and a generally C-shape in section anchor ring for engaging a plurality of said clip members and compressing said trim member against a tire rim, said anchor ring having inwardly open means complementary to said anchoring means to engage therewith and aid in securing said trim member in position.

2. Apparatus for securing a resilient trim member to a pneumatic tire and rim assembly and comprising a plurality of clip members each having overhanging radially outer edge flanges, a trim member having radially inner and outer sections, said clip members being adapted to engage a tire rim flange by said edge flanges, said radially inner section of said trim member being adapted to overlie and abut against said clip members when operatively positioned on a tire rim flange, said trim member having integral anchoring means extending therefrom on the radially inner section thereof, and an anchor ring for engaging a plurality of said clip members when engaging a rim flange and compressing the radially inner sections of said trim member against a tire rim, said anchor ring having axially inwardly open means complementary to said anchoring means to engage therewith and aid in securing said trim member in position.

3. Apparatus for securing a resilient trim member to a pneumatic tire and rim assembly and comprising a plurality of clip members having overhanging radially outer edge flanges, a trim member having radially inner and outer sections, said clip members being adapted to engage a tire rim flange by said radially outer edge flanges, said radially inner section of said trim member being adapted to overlie and abut against said clip members when operatively positioned on a tire rim flange, said trim member having an integral annular anchoring rib extending outwardly therefrom, and a generally C-shape in section anchor ring for engaging said clip members and compressing said trim member against a tire rim, said anchor ring having an inwardly open annular bead thereon generally complementary to said anchoring rib to engage therewith and aid in securing said trim member in position.

4. Apparatus for securing a resilient trim member to a pneumatic tire and rim assembly and comprising a plurality of clips having an inwardly turned overhanging top edge flange for engaging a tire rim flange, a resilient trim member having a radially inner skirt portion and a radially outer decorative portion for resiliently bearing against a tire sidewall, said skirt portion of said trim member and said outer walls of said clips having apertures therein alignable when said trim member and clips are operatively positioned, said clips having splits in their walls extending from said apertures therein to provide resilient locking sections defining said apertures, and headed metal studs having locking ribs thereon for extending through said apertures and engaging said locking sections to secure said trim member to said clips when on a tire rim.

References Cited in the file of this patent

UNITED STATES PATENTS

| | | |
|---|---|---|
| 2,173,321 | Hatch | Sept. 19, 1939 |
| 2,173,544 | Tinnerman | Sept. 19, 1939 |
| 2,749,184 | Wood | June 5, 1956 |

FOREIGN PATENTS

| | | |
|---|---|---|
| 436,544 | Great Britain | Oct. 14, 1935 |
| 1,061,278 | France | Nov. 25, 1953 |